United States Patent
Yoon et al.

(10) Patent No.: US 8,588,467 B2
(45) Date of Patent: Nov. 19, 2013

(54) APPARATUS AND METHOD FOR DETECTING HANDS OF SUBJECT IN REAL TIME

(75) Inventors: Je-Han Yoon, Seongnam-si (KR);
Hee-Jun Song, Namyangju-si (KR);
Hyun-Sik Shim, Yongin-si (KR);
Young-Hee Park, Seoul (KR);
Jae-Wook Jeon, Suwon-si (KR);
Tae-Houn Song, Suwon-si (KR);
Cong-Thien Pham, Suwon-si (KR);
Seung-Hun Jin, Suwon-si (KR);
Duc-Dung Nguyen, Suwon-si (KR)

(73) Assignees: Samsung Electronics Co., Ltd., Suwon-si (KR); Sunkyunkwan University Foundation for Corporate Collaboration, Suwon-si (KR)

( * ) Notice: Subject to any disclaimer, the term of this patent is extended or adjusted under 35 U.S.C. 154(b) by 546 days.

(21) Appl. No.: 12/803,369

(22) Filed: Jun. 25, 2010

(65) Prior Publication Data
US 2010/0329511 A1 Dec. 30, 2010

(30) Foreign Application Priority Data
Jun. 25, 2009 (KR) ........................ 10-2009-0057196

(51) Int. Cl.
*G06K 9/00* (2006.01)
(52) U.S. Cl.
USPC ........................................................ 382/103

(58) Field of Classification Search
USPC .............. 345/156, 157; 348/116, 77; 382/103
See application file for complete search history.

(56) References Cited

U.S. PATENT DOCUMENTS

| | | | |
|---|---|---|---|
| 2006/0284837 A1* | 12/2006 | Stenger et al. | 345/156 |
| 2008/0001095 A1 | 1/2008 | Astley et al. | |
| 2009/0102788 A1* | 4/2009 | Nishida et al. | 345/158 |
| 2009/0324008 A1* | 12/2009 | Kongqiao et al. | 382/103 |
| 2011/0299774 A1* | 12/2011 | Manders et al. | 382/168 |

FOREIGN PATENT DOCUMENTS

| | | |
|---|---|---|
| KR | 1020010009588 A | 2/2001 |
| KR | 1020070061231 A | 6/2007 |
| KR | 1020080029730 A | 4/2008 |
| KR | 100850931 B1 | 8/2008 |
| WO | WO 2007/097548 A1 | 8/2007 |

* cited by examiner

*Primary Examiner* — Amara Abdi

(57) ABSTRACT

An apparatus and method can effectively detect both hands and hand shape of a user from images input through cameras. A skin image detecting skin regions from one of the input images and a stereoscopic distance image are used. For hand detection, background and noise are eliminated from a combined image of the skin image and the distance image and regions corresponding to actual both hands are detected from effective images having a high probability of hands. For hand shape detection, a non-skin region is eliminated from the skin image based on the stereoscopic distance information, hand shape candidate regions are detected from the remaining region after elimination, and finally a hand shape is determined.

19 Claims, 18 Drawing Sheets

APPARATUS AND METHOD FOR DETECTING HANDS OF SUBJECT IN REAL TIME

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jun. 25, 2009 and assigned Serial No. 10-2009-0057196, the entire disclosure of which is hereby incorporated by reference.

TECHNICAL FIELD OF THE INVENTION

The present invention relates generally to image processing, and more particularly, to an apparatus and method for detecting information of user's both hands in real time from images input through cameras using an image processing technique.

BACKGROUND OF THE INVENTION

Depending mainly upon whether a keyboard or a mouse is used as an interface between a computer and a user, an algorithm for recognizing a user, that is, a method for extracting user's face or hands has been considered important.

Generally, a method for detecting user's hands to be recognized from an image photographed through a camera uses unique characteristic information such as color, shape, size, and so forth of a hand and has limits to detection because only one hand can be mainly detected and tracked. Upon detection of both hands, it is difficult to distinguish between a right hand and a left hand because characteristic information such as their color, sizes and shapes is similar; and it is not easy to make a judgment when hands overlap objects having characteristic information similar to the hands. Namely, since distinct characteristic information that can distinguish between both hands is not sufficient, there are difficulties in simultaneous detection of both hands.

Conventional methods for distinguishing between both hands includes a method for identifying all types where both hands are overlapped and a method for calculating a distance between a hand and an elbow by applying a distance conversion function to shading information from the hand to the elbow. Such hand detection methods should extract the locations of user's hands and face using skin color information; however, it is very difficult to accurately extract the locations of hands and face through the recognition of skin color using only color images.

Meanwhile, a gesture including a hand motion is one of human various communication methods and many researches on interaction with a computing machine using the gesture are being in progress. If algorithms for detecting hands are robustly achieved, they will be able to be effectively used in various multimedia based industries. Among them, a hand detection method can be usefully employed for hand gesture recognition and is a very useful technique in developing an interface between a computer and a user to be more convenient for the user.

In the above-described method for identifying types where both hands are overlapped, it is difficult to detect both hands if another overlap except for the identified types occurs. Even though the method is compensated for, there are many types of operations required for the location detection of both hands. These operations for location detection of both hands are complicated. Even in the method using the distance conversion function, a whole image shown from hands to heels is indispensable. In this case, since the number of gestures that a user can make is small, it is not suitable to actually use the method using the distance conversion function. Even in the method for detecting the locations of both hands by extracting characteristic information of both hands, an operation time is abruptly increased when increasing the amount of characteristic information in priority to improve tracking performance. Especially, upon detection of hands using skin color, erroneous detection of a serious level may occur due to the presence of an object having color similar to skin color or to an environmental factor such as the reflection of lighting.

Meanwhile, in hand shape detection, if hand shapes can be effectively extracted even while a user freely moves, various applications in real life will be possible.

SUMMARY OF THE INVENTION

To address the above-discussed deficiencies of the prior art, it is a primary object to provide at least the advantages described below. Accordingly, an aspect of the present invention provides an apparatus and method for detecting information of user's both hands in real time from image input through cameras.

Another aspect of the present invention provides an apparatus and method for effectively detecting hand shapes from input images without being restricted to a user's gesture.

In accordance with an aspect of exemplary embodiments of the present invention, an apparatus for detecting hands of a subject in real time includes: a first image input part that generates a first image photographed at a first side with respect to one subject and a second image input part that generates a second image photographed at second side with respect to the subject; a stereoscopic processor that generates a distance image indicating 3-dimensional distance information by comparison information of the first image and the second image; a skin region detector that determines whether each pixel within any one of the first and second images is a skin pixel and generates a skin image indicating whether each pixel within any one of the first and second images is a skin pixel; a skin/distance pixel combiner that generates a combined image by combining the distance image with the skin image in units of pixels, a background and noise eliminator that generates an effective image including two or more hand candidate regions by eliminating background and noise from the combined image; and a hand correlation determiner that calculates effective values with respect to respective pairs of the hand candidate regions which can be combined within the effective image and determines a pair of hand candidate regions having the largest effective values as hand regions.

In accordance with another aspect of exemplary embodiments of the present invention, a method for detecting hands of a subject in real time includes: determining whether pixels within any one of a first image and a second image corresponding to left and right images which photograph one subject are skin pixels; generating a skin image indicating whether each pixel within any one of the first and second images is a skin pixel; generating a distance image indicating 3-dimensional distance information by comparison information of the first and second images; generating a combined image by combining the distance image with the skin image in units of pixels; generating an effective image including two or more hand candidate regions by eliminating background and noise from the combined image; and calculating effective values with respect to respective pairs of the hand candidate regions which can be combined within the effective image and determining a pair of hand candidate regions having the largest effective values as hand regions.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Figure 1:
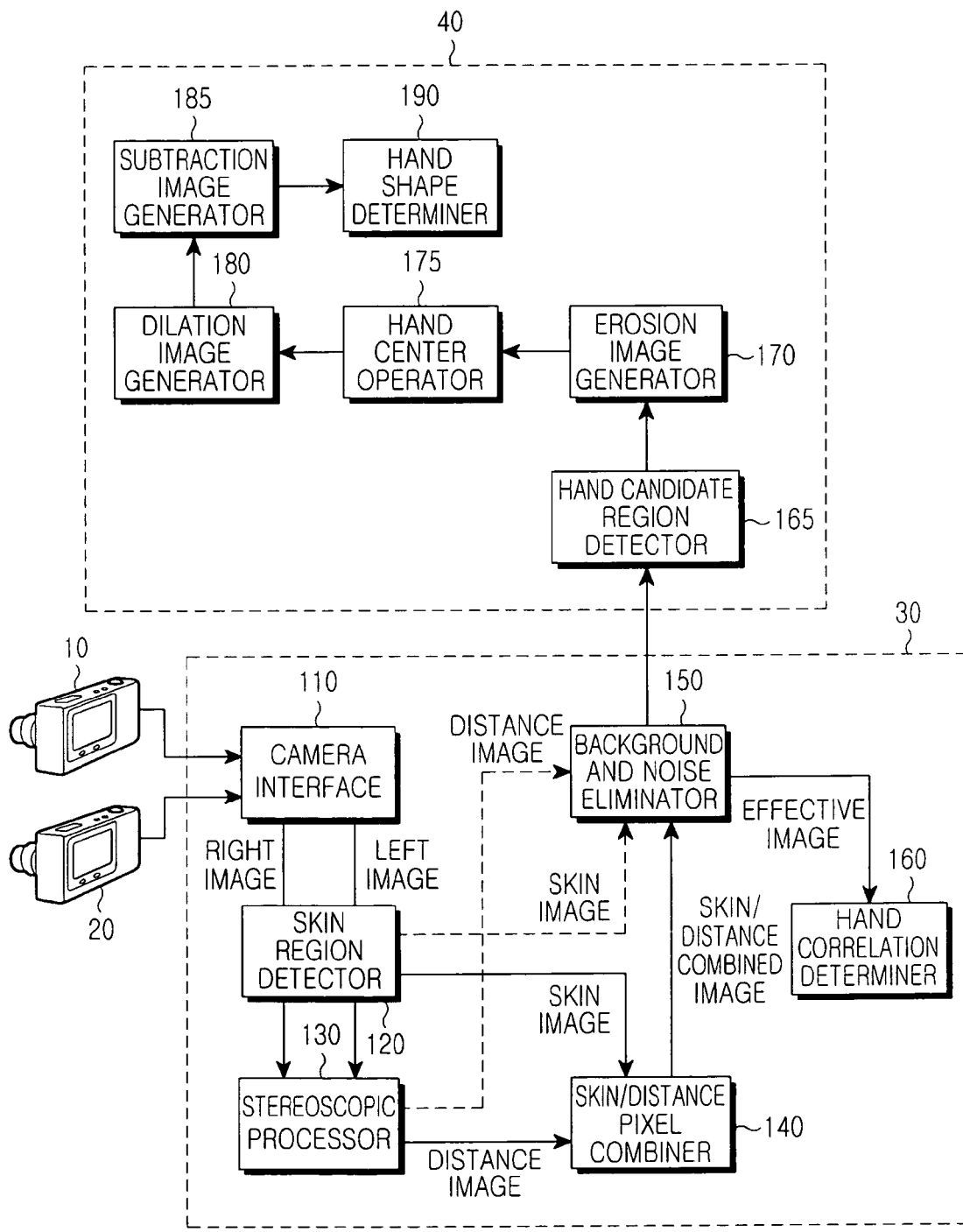
FIG. 1 illustrates a configuration of a hand detection apparatus according to the present invention.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged image processing system.

The present invention proposes a method for effectively detecting user's both hands or hand shapes from images input through cameras. To this end, the present invention uses a skin image obtained by detecting a skin region using skin color from input images and uses a stereoscopic distance image. In a hand detection process, background and noise are eliminated from a combined image of the skin image and the distance image, and a region corresponding to actual both hands is detected from an effective image having a high probability of hands. Meanwhile, in a hand shape detection process, a non-skin region is eliminated from the skin image based on the stereoscopic distance information, hand shape candidate regions are detected from the remaining region after elimination, and finally a hand shape is determined.

Before a description of the hand detection process, a stereoscopic image processing technique used in the present invention is described.

When using only skin color, it may be difficult to accurately detect a skin region due to various environmental factors. Therefore, the present invention proposes a method for combining a distance image obtained through stereoscopic image processing for two color images input through two cameras and a color image. For a combination of the color image and the distance image, points to be considered are that many amounts of operations are needed to obtain the distance image through stereoscopic image processing and that a memory is additionally used due to the additional storage of an original color image corresponding to the distance image generated every time in priority to combine the original color image and the distance image.

An operation time consumed to obtain a stereoscopically processed distance image is a key issue. In a Human Computer Interface (HCI), which is a main application field of the present invention, the operation time should be necessarily considered for an actual application because a response time to detection functions as a very important fact in addition to the accuracy of information of both hands.

The exemplary embodiments of the present invention will be separately described as follows. The first exemplary embodiment relates to a hand detection process for detecting user's both hands and proposes a dedicated hardware structure for hand detection processing through a combination of a color image and a distance image in consideration of a processing speed problem. According to the first exemplary embodiment of the present invention, a hardware device structure for a combination of an original color image and a distance image obtained by stereoscopically processing original color images, and a method and apparatus for detecting actual both hands after the combination of the two images will be described.

Meanwhile, the second exemplary embodiment of the present invention relates to a hand shape detection process in which a skin region is detected, hand candidate regions are detected from a remaining part after a non-skin region is removed based on stereoscopic distance information and a hand shape is determined.

A hand detection apparatus having the above-described functions is illustrated in FIG. 1. The hand detection apparatus includes a hand detection unit 30 and a hand shape detection unit 40.

The hand detection unit 30 includes a camera interface 110, a skin region detector 120, a stereoscopic processor 130, a skin/distance pixel combiner 140, a background and noise eliminator 150, and a hand correlation determiner 160.

Two cameras 10 and 20 photograph an external subject and generate left and right images obtained by photographing one subject at the left and right sides thereof. The two cameras 10 and 20 are separated from each other by a predetermined distance in priority to generate a sense of distance according to user's binocular disparity. The two color images are input to the hand detection unit 30 through the camera interface 110. The color images input through the camera interface 110 are transmitted to the skin region detector 120 and the stereoscopic processor 130. The skin region detector 120 uses only one of the two images and the stereoscopic processor 130 uses both of the two images.

The skin region detector 120 detects a skin region using skin color with respect to one of the two input images. Namely, the skin region detector 120 judges, with respect to all pixels within one image, whether they are skin pixels and generates a skin image indicating whether each pixel within the one image is a skin pixel. More specifically, the skin region detector 120 determines whether pixels within one image are skin pixels by confirming a previously generated skin probability table value using a Gaussian mixture model with respect to all pixels within the input image. However, the skin detection method is not limited thereto and various techniques may be applied for the skin region detection.

Figure 2:
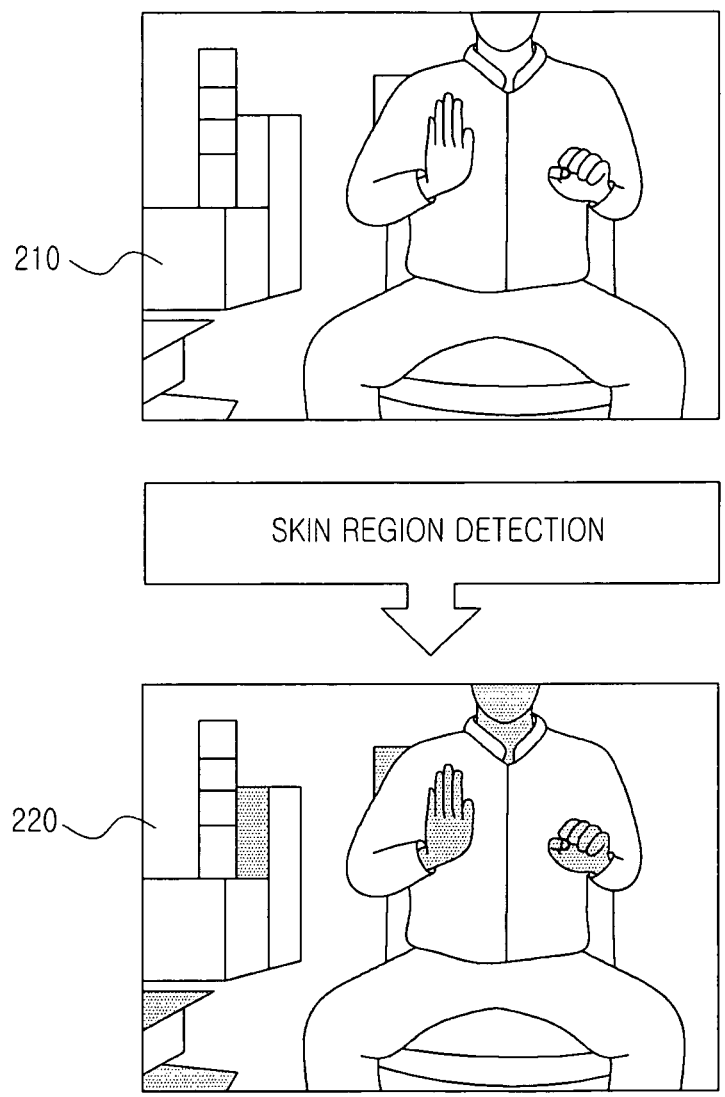
FIG. 2 illustrates a result of skin region detection according to an exemplary embodiment of the present invention.

FIG. 2 illustrates a result of skin region detection. A skin image 220 is generated by performing the skin region detection upon an original color image 210. Through the skin region detection, the skin image 220 can be obtained in which only pixels similar to previously learned skin color are maintained and the other pixels are eliminated. The obtained skin image 220 is input to the skin/distance pixel combiner 140.

Meanwhile, the stereoscopic processor 130 generates a distance image through stereoscopic processing with respect to the right image and the left image. More specifically, the stereoscopic processor 130 generates the distance image indicating 3-dimensional distance information by comparison information of the right image and the left image through a stereoscopic image processing technique. The 3-dimensional distance information is obtained by a principle that a difference of a field of view occurs between images when two cameras photograph the same subject, similarly to recognition of a sense of distance according to human binocular disparity. In this case, any methods which can obtain a distance image through stereoscopic processing may be applicable in the stereoscopic processor 130. The main point of the present invention is a method for detecting hands by combining distance image information obtained through stereoscopic processing and color information and therefore a detailed description of the stereoscopic processing process is omitted.

The distance image obtained through stereoscopic image processing is classified in units of pixels and is input to the skin/distance pixel combiner 140. In addition to the distance image, the skin image generated from the skin region detector 130 is input to the skin/distance pixel combiner 140 and the two images are combined as one skin/distance combined image.

Figure 3:
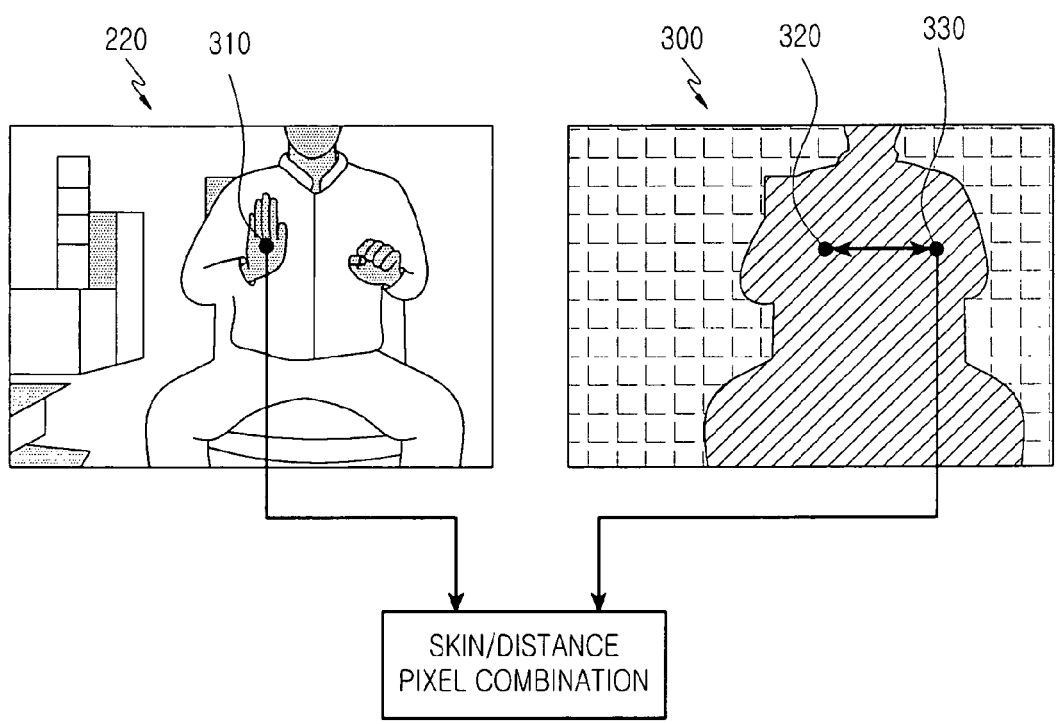
FIG. 3 illustrates a location difference on a skin image and a distance image according to an exemplary embodiment of the present invention.

In this case, there is a difference in location between output pixels according to a difference in processing time between stereoscopic image processing and skin region detection. Typically, a time consumed for the stereoscopic image processing is longer than a time consumed for the skin region detection. The difference in location between the skin image 220 and a distance image 300 generated according to a difference in a pipeline processing time between the two images is graphically shown in FIG. 3. In FIG. 3, a location indicated by a reference numeral 310 on the skin image 220 of output pixels of the skin region detector 120 generated at a current time should be a location indicated by a reference numeral 320 on the distance image 300 of distance value pixels generated from the stereoscopic processor 130; however, it is actually located as indicated by a reference number 330. Thus, many clocks necessary for stereoscopic image processing mean that more clocks are demanded to obtain an effective result even though the same pixel is input at the same time point.

Figure 4:
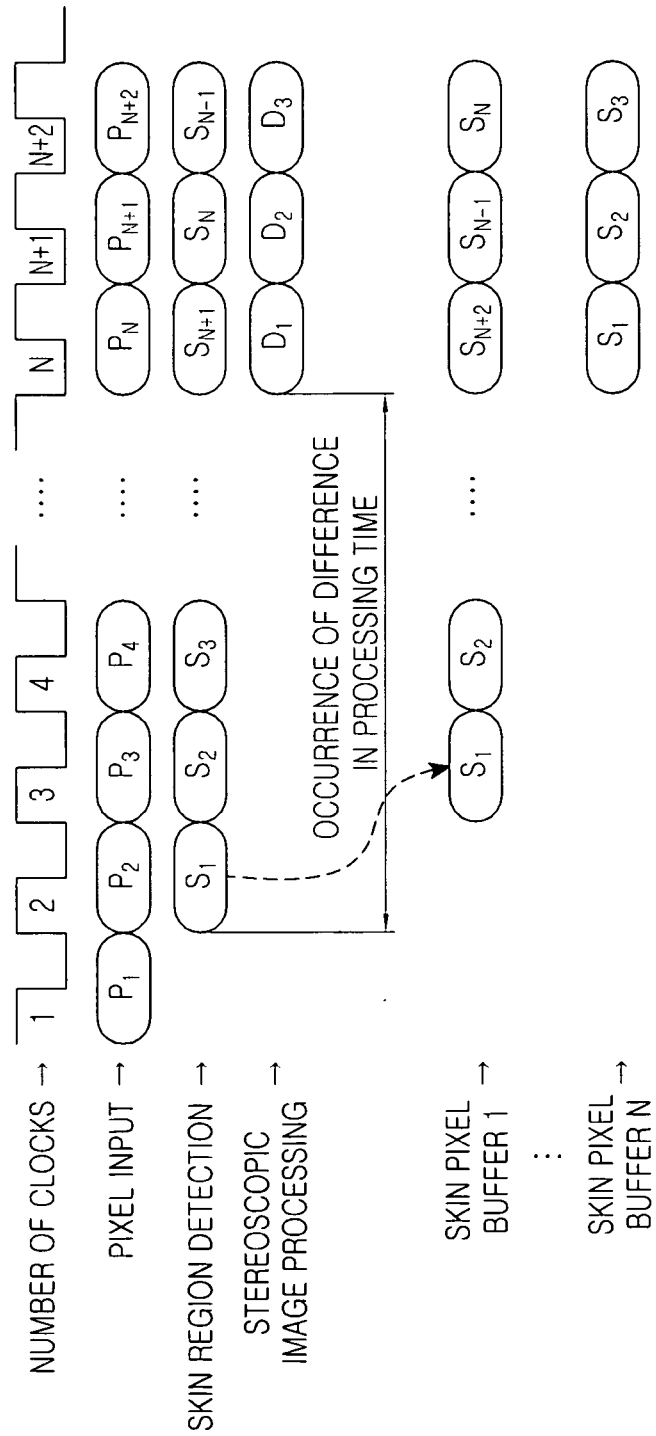
FIG. 4 illustrates the number of clocks needed for stereoscopic processing according to an exemplary embodiment of the present invention.

The number of clocks needed according to stereoscopic processing is described with reference to FIG. 4. It is assumed in FIG. 4 that there are needed one clock for the skin region detection and N clocks for the stereoscopic image processing when one pixel P is input per clock. Referring to FIG. 4, a skin pixel S1, which is a result of the skin detection, is output after one clock and a distance pixel D1, which is a result of the stereoscopic image processing, is output after N clocks, based on a pixel input time. Accordingly, a clock difference should be compensated for in priority to combine the color image and the distance image.

To this end, (N−1) skin pixel buffers comprised of D flip-flops are added to the skin/distance pixel combiner 140. Then skin pixels prior to the N-th clock at which the distance pixel is generated through the stereoscopic image processing can be temporarily stored. Thus, a delay caused by the stereoscopic image processing can be compensated for by using the skin pixel buffers.

Figure 5:
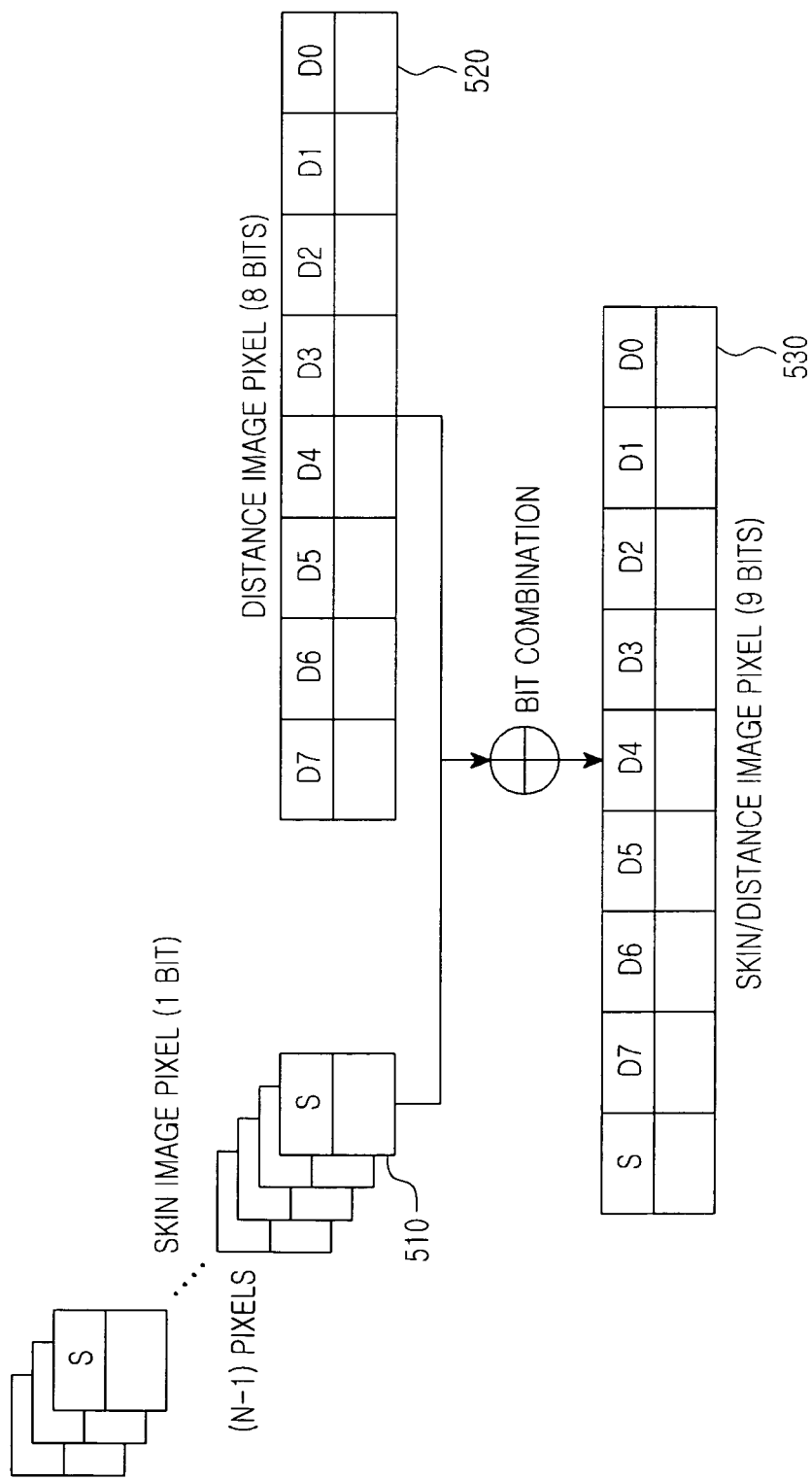
FIG. 5 illustrates a conceptual diagram of an operation of a skin/distance pixel combiner according to an exemplary embodiment of the present invention.

FIG. 5 illustrates an operation of the skin/distance pixel combiner 140. A process is described for combining the distance image and the skin image after compensation for the delay.

The skin/distance pixel combiner 140 combines a skin image pixel and a distance image pixel. The skin image pixel and the distance image pixel are the same in location on an image of an original pixel. A skin image can be expressed only by one bit because only the presence/absence of skin color of a corresponding pixel is discriminated. A distance image includes information of 8 bits. One-bit skin image pixel 510 and an 8-bit distance image pixel 520 are bit-combined, thereby obtaining a skin/distance image pixel 530 having a data width of 9 bits.

Through such a compensation process, the skin/distance image combiner 140 generates pixels in which skin and distance information is combined as described previously. The skin/distance pixel combiner 140 calculates a location on an image of corresponding pixels, such as coordinate information, and provides the coordinate information to the background and noise eliminator 150.

Figure 6:
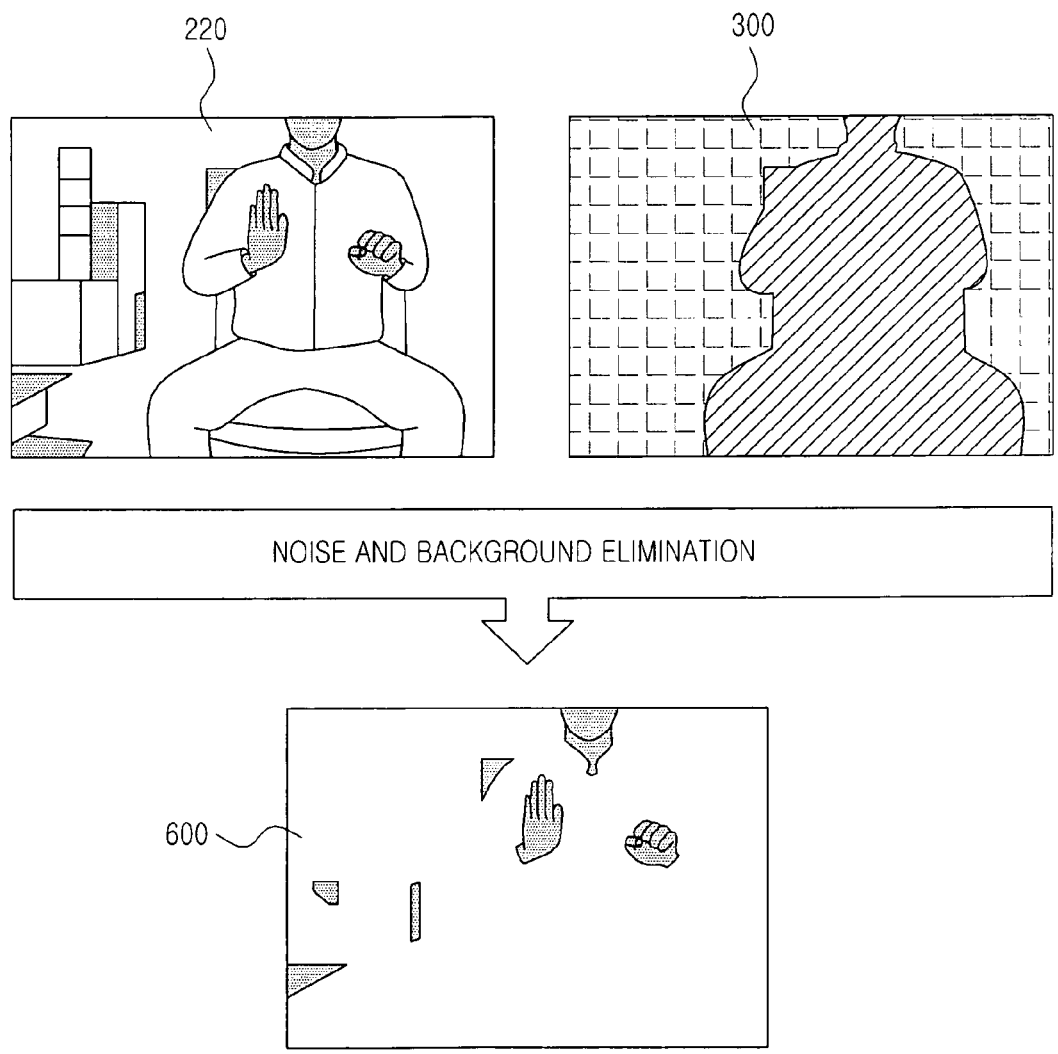
FIG. 6 illustrates an image in which background and noise are eliminated from a result of combination of a skin image and a distance image according to an exemplary embodiment of the present invention.

The background and noise eliminator 150 eliminates background and noise based on the skin and distance information and generates an effective image indicating only a region having a high probability of hands. FIG. 6 illustrates an image 600 in which background and noise are eliminated from a result of a combination of the skin image 220 and the distance image 300. It can be seen from the image 600 that only skin color regions of a predetermined size or more remain.

Figure 7:
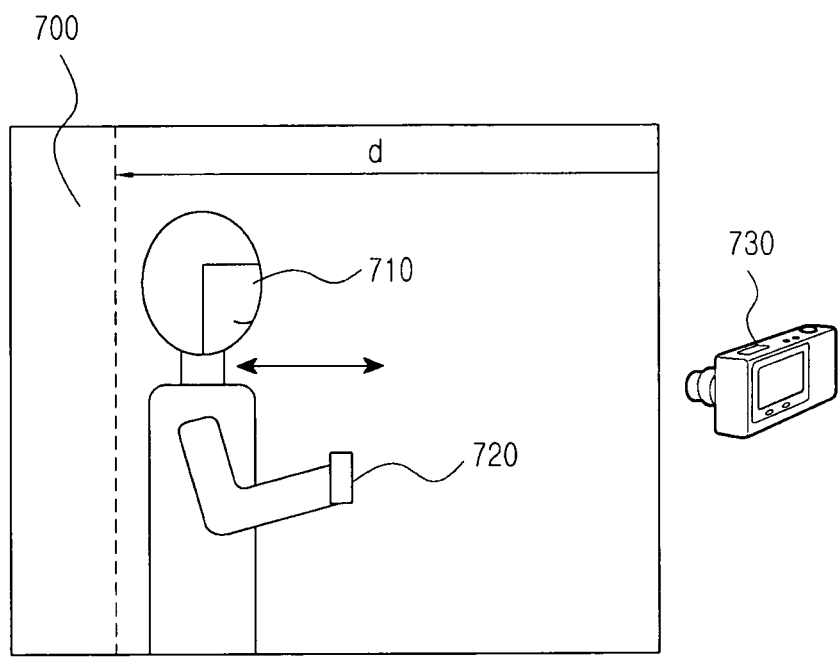
FIG. 7 illustrates a background elimination method according to an exemplary embodiment of the present invention.

More specifically, the background and noise eliminator 150 eliminates background using the distance information from the skin/distance combined image and eliminates noise using the skin information. With reference to FIG. 7, a method for eliminating background is described. In the example shown in FIG. 7, a side view is shown when expressing an image photographing a user who watches the front of a camera 730 as a 3-dimensional image. For example, a hand is generally located at the front-most of the user and background is located at the back of the user. Then pixels having a distance value larger than a preset reference value 'd' from the right side of the image may be all recognized as a background 700, thereby simply eliminating the background.

In many cases, noise is mixed in an image input by a camera by wrong recognition as skin color although it is not skin due to environmental factors such as the reflection of light. Such noise often appears as a small unit in part such as dots instead of being successively distributed throughout a wide region. Regions corresponding hands or a face is distributed throughout a relatively wide region. Accordingly, for noise elimination, pixels belonging to successive regions are searched, the number of pixels belonging to each region is counted, and a region having the number of pixels less than a predetermined number is eliminated determined as noise. Namely, if the size of a skin region in a skin image is less than a predetermined size, the skin region is regarded as noise. In this case, a connected-component detection technique may be used to identify connectivity between pixels. A binary image has pixel values of '0' and '1' only and, in the binary image, connectivity between any two pixels cannot be determined. However, the connected-component detection technique enables determination for connectivity between two pixels within an image. Pixels being connected to each other mean that the pixels are present on one connected component, that is, an object. Such a connected-component detection technique may be easily constructed with reference to "A General Approach to Connected-Component Labeling for Arbitrary Image Representations" published by Michael B Dillencourt in 1992 in 'Journal of ACM'.

Figure 8:
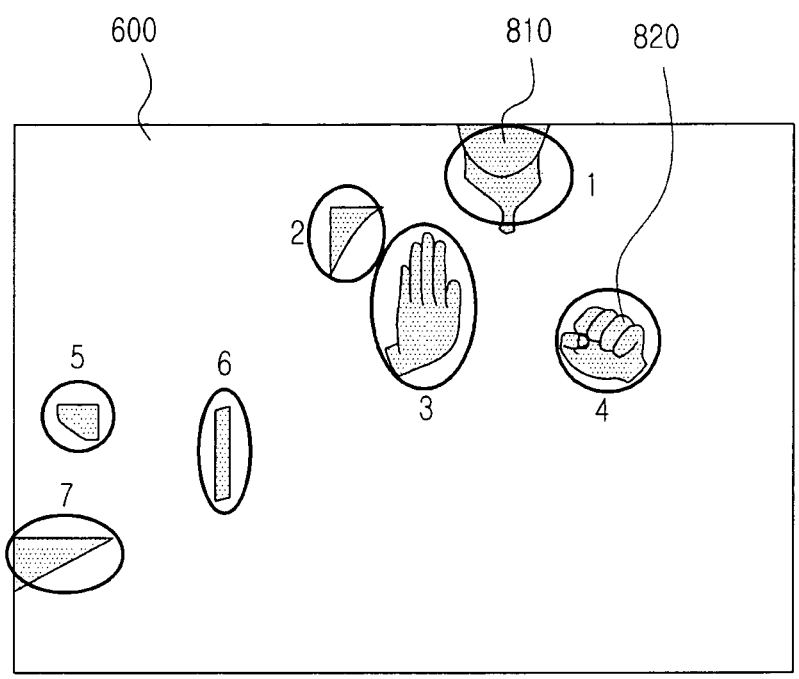
FIG. 8 illustrates an effective image input to a hand correlation determiner according to an exemplary embodiment of the present invention.

A generated effective image is provided to the hand correlation determiner 160 which detects both hands by calculating effective values of two hand candidate regions among a plurality of hand candidate regions within the effective image. In this case, hand candidate regions are selected in pairs. For the selected hand candidate regions, size priorities, size differences, distance priorities and location differences are calculated and added as many times as the number of selectable combinations, and two hand candidate regions having the largest effective values among the added effective values are determined as hand regions. The effective image input to the hand correlation determiner 160 is illustrated in FIG. 8. Referring to FIG. 8, since background and noise have been eliminated in an effective image 600, there remain only skin color regions of an effective distance range having a predetermined size or more as indicated by reference numerals 810 and 820. In the present invention, such skin color regions are referred to as effective regions. The hand correlation determiner 160 detects regions corresponding to actual both hands from among the effective regions and generates size, location and distance information of each hand region. To this end, if there are several effective regions within the effective image as shown in FIG. 8, the respective effective regions are distinguished by assigning numbers thereto according to a raster scan order.

The hand correlation determination method proposed in the present invention is to extract two regions corresponding to both hands when several effective regions are present. Under the state that a man holds out his both hands towards the camera 730 as illustrated in FIG. 7, the both hands are located under the face, the heights of both hands are similar to each other, and the both hands are horizontally separated from each other by a predetermined distance to the left and right sides based on a face 710. In terms of a distance with the camera 730, both hands 720 are nearer to the camera 730 relative to the face 710 and distances between the both hands 720 and the camera 730 are similar. As described above, since both hands are detected based on their locations, the locations of both hands may be limited somewhat. Accordingly, the above method may be used at the start of a system operation to accurately identify information of both hands and next similarity between newly input candidate regions may be discriminated, thereby tracking a variation of hand information.

Under the above-described assumptions, the sizes, average vertical locations and average distances of the candidate hand regions are determined and effective values of the candidate regions are calculated through an effective value calculation equation proposed in the present invention. In this case, two regions are selected from among a plurality of regions and effective values for determining whether the selected regions are regions of both hands are calculated. The above processes are repeated so as to be performed upon all the regions. The effective value calculation equation will be described herein below.

Figure 9:
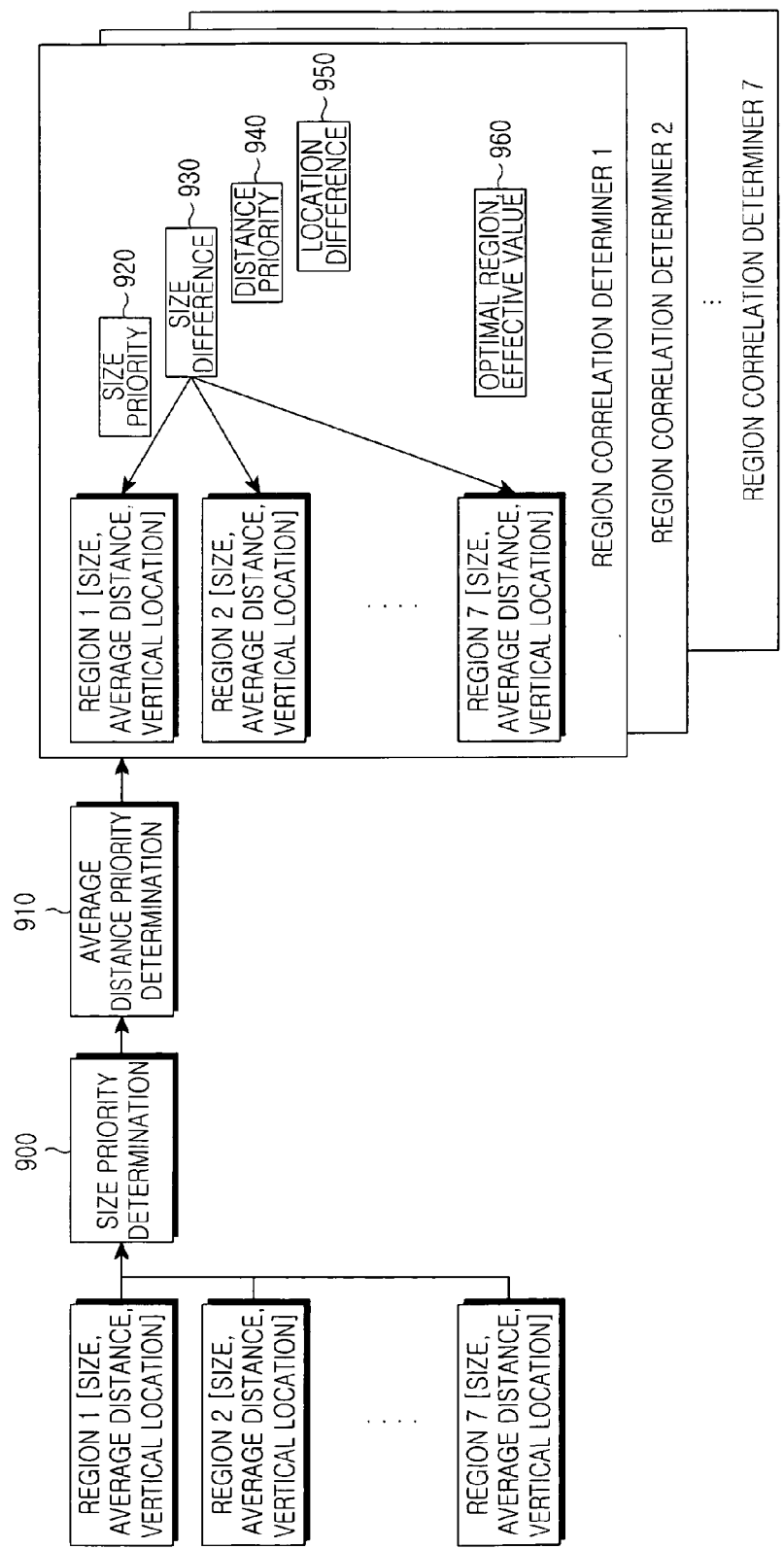
FIG. 9 illustrates a structure of a parallel processing correlation determination hardware according to an exemplary embodiment of the present invention.

When performing a hand correlation, a determination for multiple effective regions is simultaneously performed by designing a structure of a parallel processing correlation determination hardware illustrated in FIG. 9. Referring to FIG. 9, seven (7) region correlation determiners are configured with respect to seven (7) effective regions in FIG. 8. Determination of size priorities 900 is performed upon the seven (7) effective regions and determination of average distance priorities 910 according to average distances between the effective regions is performed. Next, through each of the first to seventh region correlation determiners based on each effective region, a reference region, an optimal region which constitutes a pair together with the reference region, and an effective value when the reference region and the optimal region constitute a pair are extracted. For example, in the first region correlation determiner, the first region among the seven (7) effective regions becomes the reference region and respective equations based on the reference region are used for obtaining a size priority 920, a size difference 930, a distance priority 940 and a location difference 950, thereby obtaining an optimal region and an effective value 960. Finally, the largest effective values among the effective values of the respective region correlation determiners are determined as hand regions, which are estimated as actual both hands, among the seven (7) effective regions.

As described above, two of a plurality of effective regions are selected to calculate effective values and two regions having the largest effective values are determined as hand regions corresponding to both hands. The right hand and the left hand are determined based on horizontal coordinates of the two regions. Effective values of the respective effective regions are calculated using the following Equation 1:

$$f(A, B) = f_1(A, B) + f_2(A, B) + f_3(A, B) + f_4(A, B) \quad \text{[Eqn. 1]}$$

$$f_1(A, B) = \begin{cases} 5, & \text{if } SI(A) \leq 3 \text{ and } SI(B) \leq 3 \\ 3, & \text{if } SI(A) \leq 5 \text{ and } SI(B) \leq 5 \\ 0, & \text{otherwise} \end{cases}$$

$$f_2(A, B) = \begin{cases} 5, & \text{if } |S(A) - S(B)| < \frac{1}{10} \times \max(S(A), S(B)) \\ 3, & \text{if } |S(A) - S(B)| < \frac{1}{5} \times \max(S(A), S(B)) \\ 1, & \text{if } |S(A) - S(B)| < \frac{1}{3} \times \max(S(A), S(B)) \\ 0, & \text{otherwise} \end{cases}$$

$$f_3(A, B) = \begin{cases} 5, & \text{if } DI(A) \leq 3 \text{ and } DI(B) \leq 3 \\ 3, & \text{if } DI(A) \leq 5 \text{ and } DI(B) \leq 5 \\ 0, & \text{otherwise} \end{cases}$$

$$f_4(A, B) = \begin{cases} 10, & \text{if } |H(A) - H(B)| < 70 \\ 5, & \text{if } |H(A) - H(B)| < 100 \\ 3, & \text{if } |H(A) - H(B)| < 150 \\ 0, & \text{otherwise} \end{cases}$$

Equation 1 includes $f_1(A, B)$ for obtaining a size priority, $f_2(A, B)$ for obtaining a size difference, $f_3(A, B)$ for obtaining a distance priority, and $f_4(A, B)$ for obtaining a location difference. Equation 1 is used to calculate an effective value for two selected regions whenever two regions are selected and the effective value is obtained by adding the size priority, size difference, distance priority and location difference.

$f_1(A, B)$ has a large value if two input regions are large in size relative to other regions. SI( ) represents a priority when regions are arranged in order of size and a priority of the largest region is 0. The size of each region is determined by counting pixel values corresponding to each region. For example, $f_1(A, B)$ has a high score when a size priority SI(A) of a region A is within the third priority and a size priority SI(B) of a region B is within the third priority. In this way, $f_1(A, B)$ has a high score as a size priority is high. Since a hand region is located at the front relative to other regions, the size of the hand region has a relatively high probability of a large size. The Equation $f_1(A, B)$ considers the characteristic that both hand regions have a relatively high probability of a large size.

$f_2(A, B)$ has a large value as the sizes of two input regions are similar. S( ) indicates the size of a corresponding region, that is, the number of pixels belonging to a corresponding region. $f_2(A, B)$ considers the characteristic that the sizes of both hands are similar. In $f_2(A, B)$, |S(A)–S(B)| denotes an absolute value of a difference in size between two regions. For example, if the size of a region A is 100 and the size of a region B is 80, then |S(A)–S(B)| becomes 20.

$$\frac{1}{C} \times \max(S(A), S(B))$$

is a value dividing the size of a large region of two regions by C and denotes a size value of a ratio designated by C. Consequently, $$|S(A) - S(B)| < \frac{1}{C} \times \max(S(A), S(B))$$

is used to determine whether a difference in size between two regions is a designated ratio and enables determination as to how much similar are the sizes of two regions.

$f_3(A, B)$ has a large value as distance values of two input regions are small relative to distance values of other regions. This is because distances between a camera and both hands are nearer relative to distances between the camera and other regions when a user holds out both hands towards the camera. A distance priority DI( ) is obtained by averaging distance values of pixels belonging to a corresponding region and arranging an average value with respect to all regions. DI( ) being 0 indicates the nearest distance and has a large value as a distance is long. $f_3(A, B)$ has a high score as a distance priority with a camera is high and considers the characteristic that there is a high probability of both hands as two regions A and B are near to the camera.

$f_4(A, B)$ has a large value as the vertical locations of two input regions are similar. Namely, a high score is obtained as there is a little difference between the vertical locations of both hands. H( ) denotes an average vertical coordinate obtained by adding vertical coordinates, that is, y coordinates of all pixels of a corresponding region and dividing the added value by the number of pixels. |H(A)–H(B)| indicates an absolute difference in an average vertical coordinate between a region A and a region B. |H(A)–H(B)|<C is to determine whether an absolute difference of vertical coordinates is less than a predetermined value.

Figure 10:
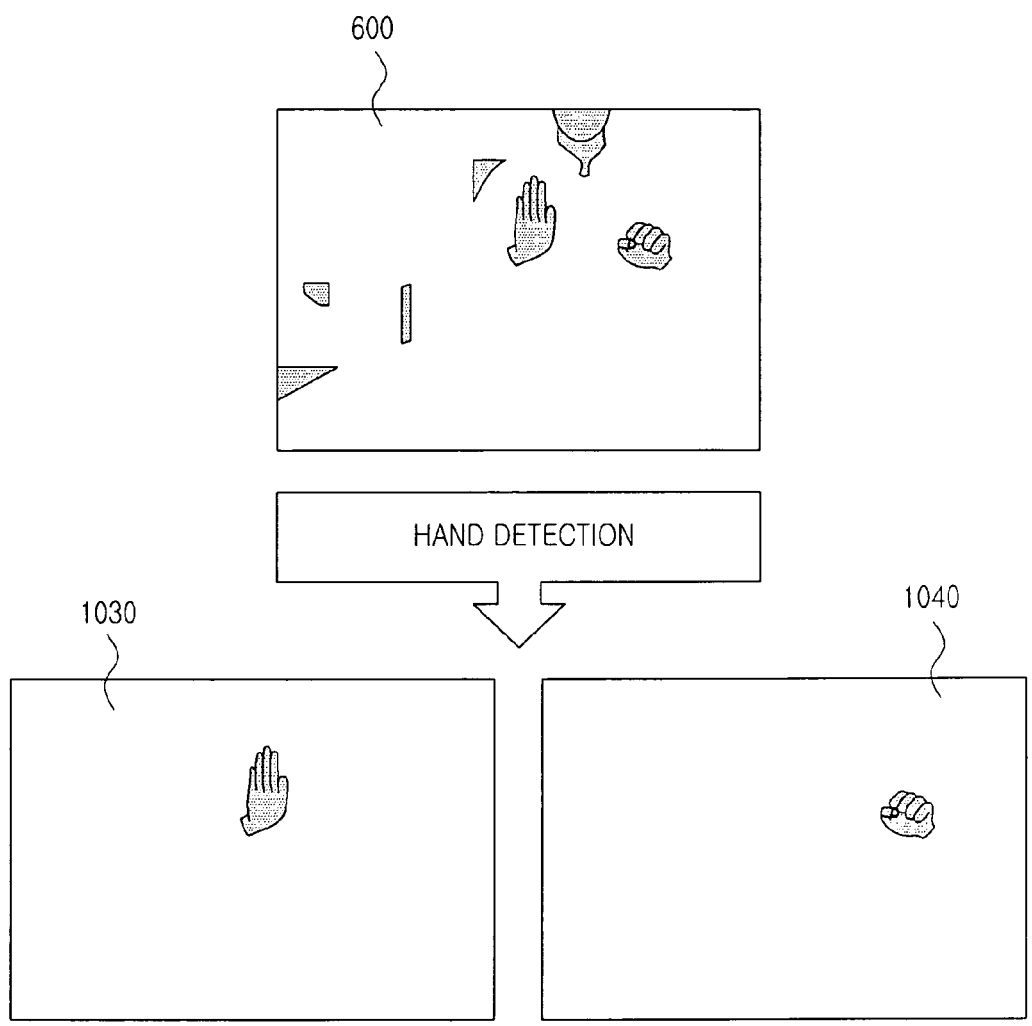
FIG. 10 illustrates an example of output images of both hands according to an exemplary embodiment of the present invention.

As described above, the hand correlation determiner 160 selects two regions from among a plurality of effect regions and performs an operation of Equation 1 which is a sum of equations representing four conditions upon the two selected regions. The hand correlation determiner 160 repeatedly performs an operation of Equation 1 as many times as the number of selectable combinations of two effective regions. If two regions having the largest effective values are calculated through Equation 1, the two regions are determined as both hands. In this way, as illustrated in FIG. 10, hand images 1030 and 1040 are output from an effective image 600 through the hand detection operation of the hand correlation determiner 160.

Figure 11:
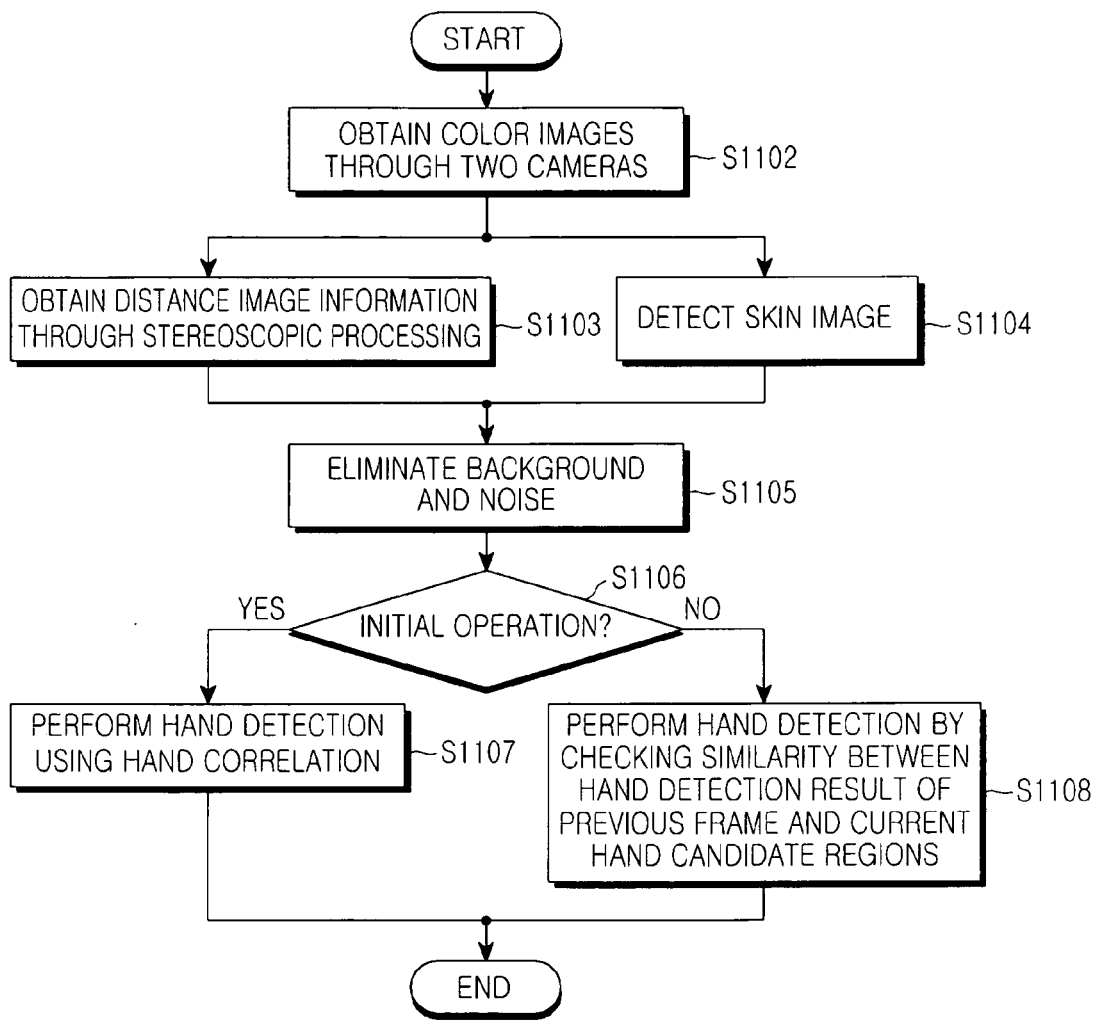
FIG. 11 illustrates a process for detecting both hands according to an exemplary embodiment of the present invention.

The above-described process for detecting both hands is illustrated in FIG. 11. In block S1102, color images are obtained through two cameras. One of the two color images is used in block S1102 to detect a skin image and the two color images are used in block S1103 to obtain a distance image through stereoscopic processing. For the skin image and distance image, synchronization is adjusted using buffers and the skin and distance images are combined. In block S1105, background and noise are eliminated from the combined image. In block S1106, it is determined whether a system is an initial operation state. The initial operation state is determined according to whether there has been a hand detection result. If the system is an initial operation state, hand detection is performed using a hand correlation of Equation 1 in block S1107. If the system is not an initial operation state, hand detection in a current frame is performed by checking the similarity between a hand detection result of a previous frame and current hand candidate regions in block S1108. If hand regions are detected, a hand detection operation in the current frame is ended.

The first exemplary embodiment of the present invention may be applicable to a human-computer interface field by simultaneously determining information of both hands. If information of a hand location is used for location control of a pointer and information of a hand state or a hand shape is used for click and non-click control of a pointer, it is possible to control a computer through the motion of hands without a direct contact through a button or a touch screen.

Figure 12:
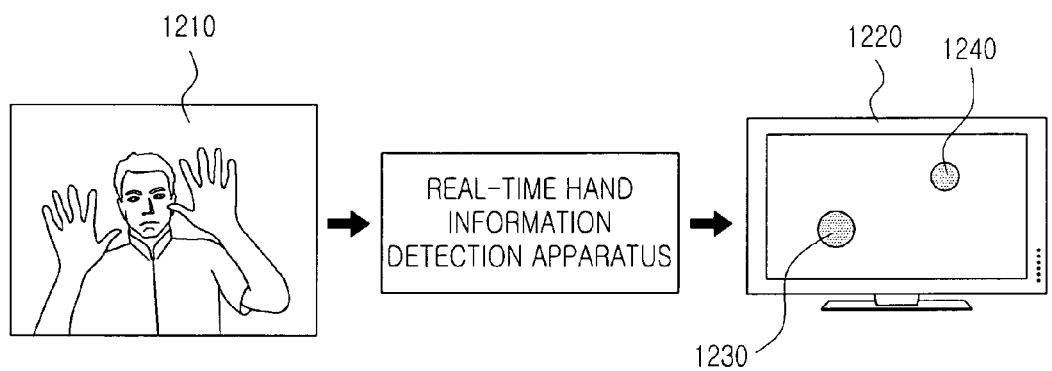
FIGS. 12 through 14 illustrate examples of an application of detected information of both hands according to an exemplary embodiment of the present invention.
Figure 13:
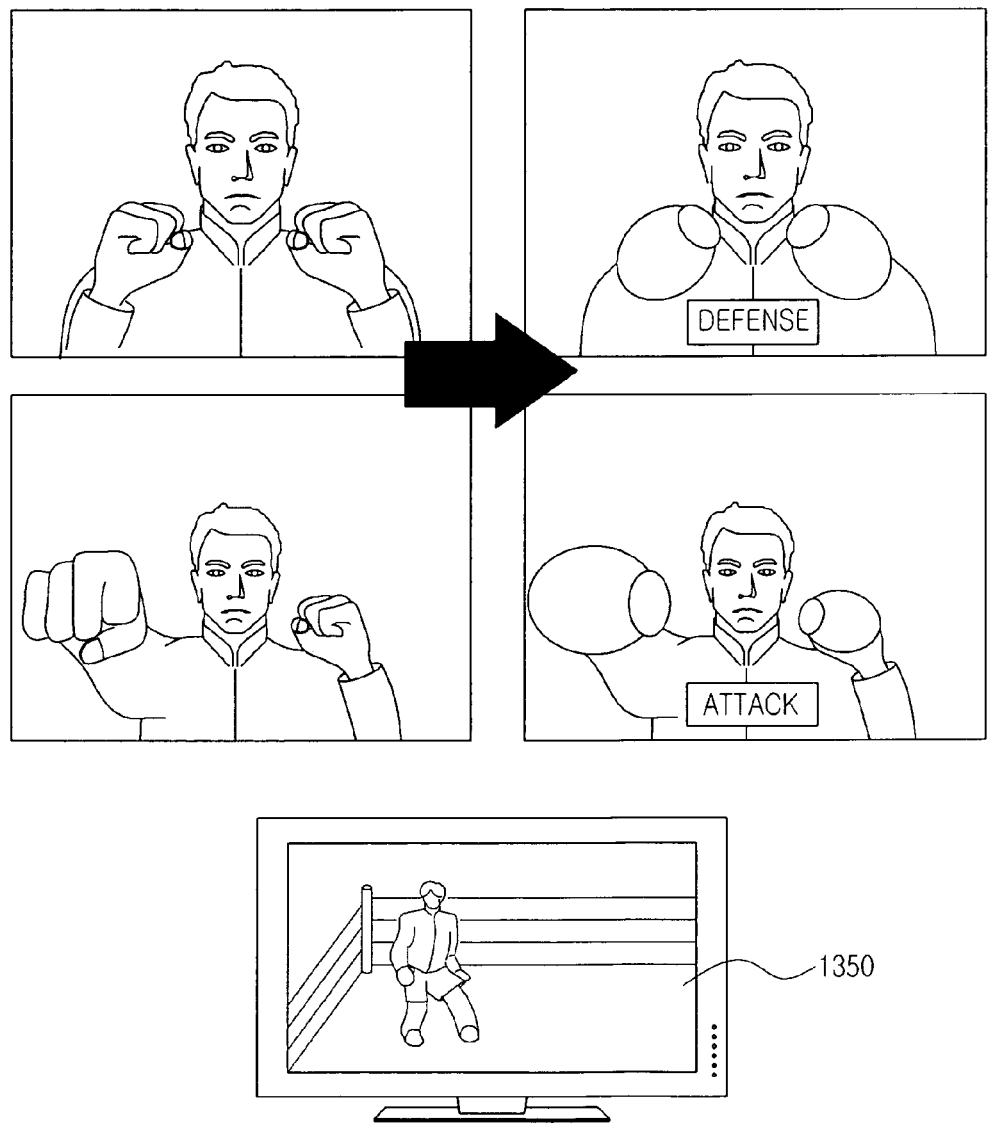
Figure 14:
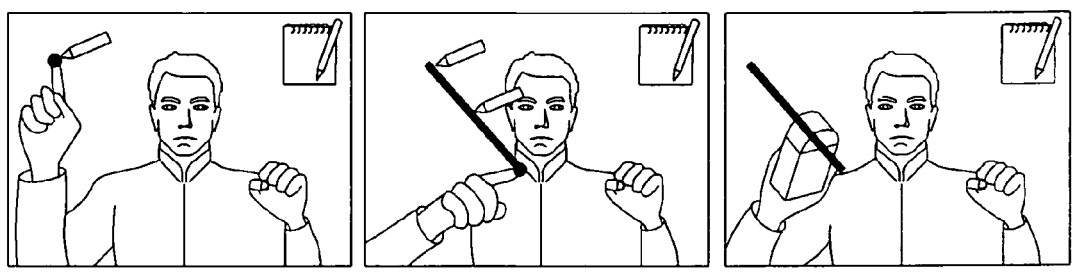

As illustrated in FIG. 12 by way of example, if both hands are detected from an input image 1210, it is possible to display pointers 1230 and 1240 corresponding to human both hands on a screen 1220. Referring to FIG. 13, an application example of a boxing game 1350 is illustrated by detecting both hands from an image showing that a man attacks and an image showing that a man defends. Referring to FIG. 14, an application example during video telephone or video conference is illustrated in which a man takes a memo on a screen. The left hand may be used to turn a memo function on or off and the right hand may be used to actually write. If a man doubles his fist, a memo icon appears on the upper right of the screen to indicate that the memo function is activated. In this state, he can write or erase notes using the right hand. If he erects his finger, the finger is operated as a pen mode and he can write at any region of the screen. If he spreads his palm, the palm is operated as an eraser mode and he can correct written notes. As shown in the above-described various examples, the present invention can achieve various and interesting image-based interfaces.

Hereinafter, a configuration of the hand shape detection unit 40 according to the second exemplary embodiment of the present invention is described. Conventionally, only a single hand has been processed or the hand has been able to be recognized only in a simple background. Moreover, since the absolute height of a hand has been used as main information, hand detection has been performed under the assumption that the orientation of the hand should be identical to the vertical axis of a camera and a distance between the hand and the camera should be constant. This results in many restrictions to a free gesture of a user such as rotation of hands. Accordingly, it is necessary to effectively extract a hand gesture while a user freely moves. In the second exemplary embodiment of the present invention, a method for detecting shapes of both hands of a user is proposed in consideration of those demands.

The operation of the skin region detector 120 in the hand detection unit 30 is identically applied to the operation of the hand shape detection unit 40. As in the hand detection process, the stereoscopic distance image is used to detect a hand shape. The operation of the stereoscopic processor 130 for generating the distance image used for hand shape detection is also identically applied to the operation of the hand shape detection unit 40.

Figure 16:
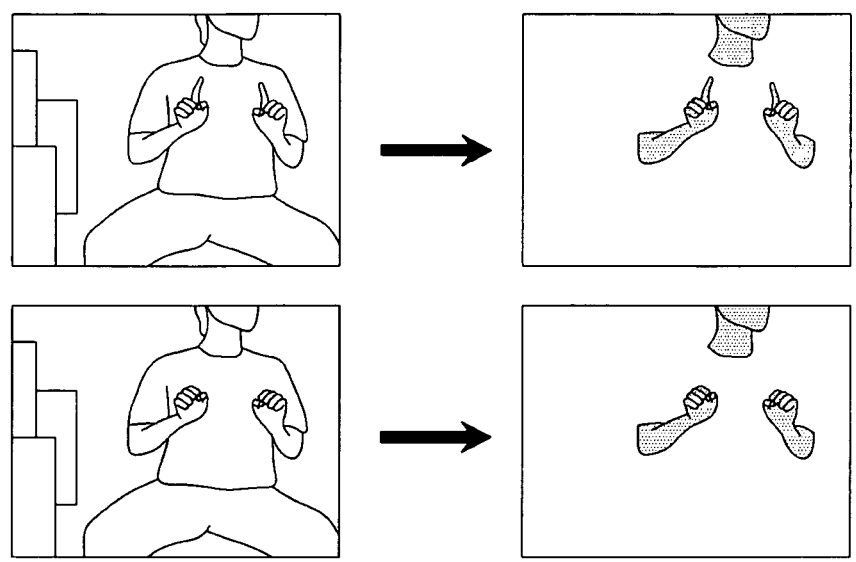
FIGS. 16 through 20 illustrate examples of a hand shape detection operation according to an exemplary embodiment of the present invention.

FIG. 16 illustrates skin images as a result of performing skin region detection from original color images. Hereinafter, a process for detecting a hand shape based on the original color images shown on the left in FIG. 16.

Referring to FIG. 16, all pixels which are not similar to skin color are determined as a region which is not skin and those pixels are eliminated from the color images. A Gaussian mixture model may be used for such skin region detection and skin images when using the Gaussian mixture model are as illustrated on the right in FIG. 16. Namely, the skin images of FIG. 16 are a result of approximating the distribution of skin color from the input color images based on the Gaussian mixture model and excluding a non-skin region so that parts which can be regarded as skin remain. The skin region detection method is not limited to using the Gaussian mixture model and various skin region detection methods may be applied.

Figure 17:
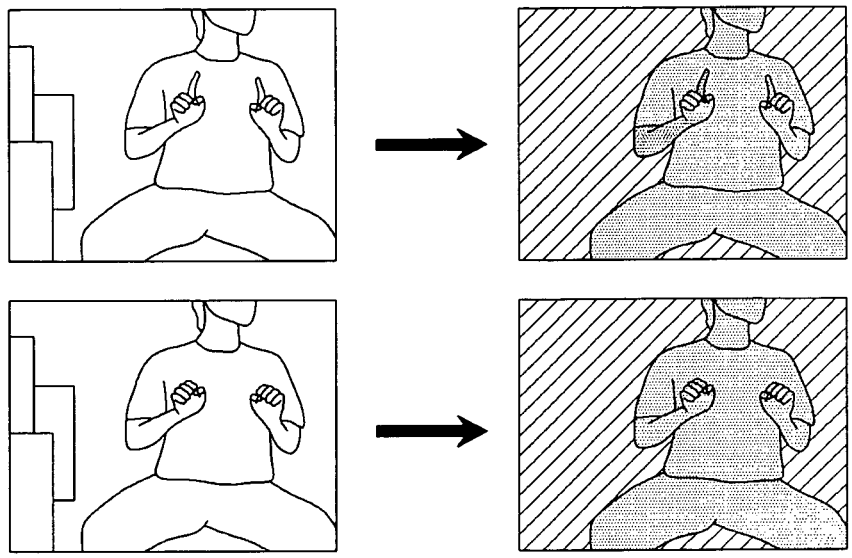

Meanwhile, distance images obtained by calculating distances between two color images are illustrated in FIG. 17. FIG. 17 shows distance images when a man spreads his fingers and when doubles his fist. More particularly, two color images photographed by two cameras when fingers are spread are used to obtain a distance image when fingers are spread, and a distance image when the fists are doubled is also similarly obtained.

The distance image is a detection result of stereoscopic distance information and shows distances between pixels indicating each object within an image and a camera are. Such stereoscopic distance information may be obtained by various methods such as Sum of Absolute Differences (SAD), Census transform, graph cuts, and so forth.

To this end, a sensor conversion based stereoscopic matching algorithm is used. If distance information is processed by a dedicated hardware such as a Field-Programmable Gate Array (FPGA), since it is possible to simultaneously refer to the distance information with an original image by a computer of a higher level without an additional operation, hand information can be rapidly detected. Then the background and noise eliminator 150 eliminates regions except for user's hands from the skin image using the above-described distance image. As in the first exemplary embodiment of the present invention, since a distance between background and a camera is long relative to a distance between the camera and a user, the background and noise eliminator 150 eliminates, using the distance image, background which have been not eliminated from the skin image. Noise may also be eliminated using the same method in the first exemplary embodiment of the present invention.

A hand candidate region detector 165 generates a hand candidate image including hand candidate regions, in which background and noise region eliminated, based on the distance image from the skin image and determines candidate regions of both hands among the hand candidate regions. To this end, the hand candidate region detector 165 finally determines candidate regions of both hands based on a distance/size using distance information from a camera to hands and Binary Large Object (BLOB) information. The size, central location, and the like of each region can be obtained through BLOB analysis and distance values of hands can be obtained by calculating an average stereoscopic disparity value of a hand region. Since the thickness of an adult's finger is usually constant, a reference table showing a relationship between a distance value and the average thickness of a finger may be made through a plurality of experiments.

Figure 18:
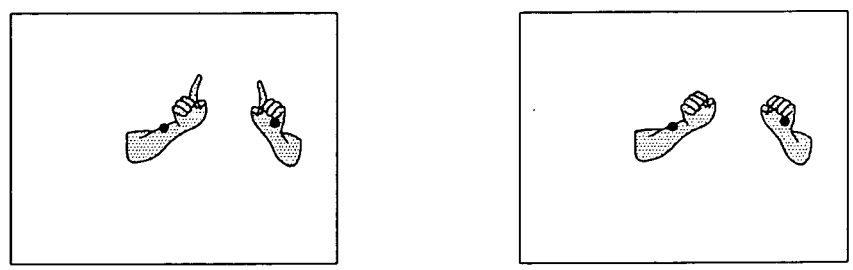

FIG. 18 illustrates a detection result of hand candidate regions. A green point denotes a central point of a candidate region of the right hand and a red point denotes a central point of a candidate region of the left hand. The central points serve as two pointers for an interface on a screen as in FIGS. 12 through 14. It is important to accurately detect the central points for precise control of a pointer. Accordingly, a process for detecting a central point from the finally determined hand region is required. The final hand center detection is performed by a hand center operator 175.

During detection of a hand candidate region, since skin color is detected upon pixels, a part which is not detected as a hand even though it corresponds to a hand region may occur. To prevent this case, the hand candidate region detector 165 generates a single hand region by filling that part through a known morphology operation. The hand candidate are detector 165 detects hand candidate regions based on a stereoscopic distance value near to a camera and the size of a detected region, classifies the candidate regions into a right hand and left hand based on slant of an initial location within an image, and tracks the hands.

While a description has made of the detection of the hand candidate regions using the skin image and the distance image, a hand shape may also be detected from hand regions as shown in FIG. 10 obtained by the first exemplary embodiment of the present invention. Further, the hand candidate region detector 165 may be constructed to detect hand candidate regions from an image in which background and noise are eliminated from a combined image generated from the skin/distance pixel combiner 140.

An erosion image generator 170 generates an erosion image by performing an erosion operation as many times as the number of erosions corresponding to a distance between both hands based on a detection result of the hand candidate regions.

The erosion image generator 170 determines the number of erosion operations which is to be repeatedly performed to eliminate pixels of the expected thickness of a finger within the hand candidate image with reference to a table which defines the number of erosion operations according to a distance value of a hand. The distance value of a hand is obtained in real time. Since the number of erosion operations can be known using the distance value of a hand and the reference table, the expected thickness of a finger of a user's hand can be obtained and the erosion operations are repeatedly performed based on the expected thickness of a finger. In other words, the erosion operations are performed 'n' times due to an average distance value of a hand region. The number of erosion operations is determined at a level in which a hand region is not eliminated in an image. Since 'n' is determined by the average distance value, a method for recording 'n' in format of a reference table may be considered so as not to decrease an operation speed.

By repetition of the erosion operations, hand candidate regions are divided to an actual hand part and the other parts. An operation can be performed based on the remaining parts and a central point of a hand can be detected using a phase relationship of the remaining parts.

Figure 19:
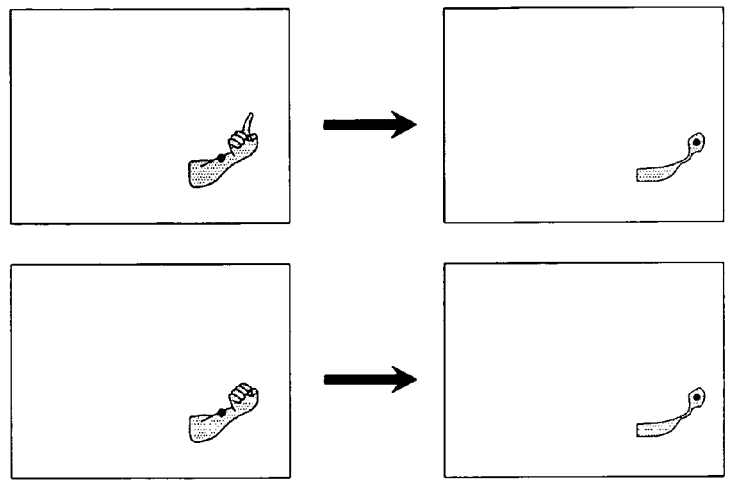

The hand center operator 175 extracts only hand regions among hand candidate regions to which an erosion operation is applied, thereby obtaining a central point of a hand indicating the actual location of a hand. For example, since a hand is located higher than a wrist and is not towards the bottom, a part higher than a horizontal axis of a screen is determined as a hand region and a central point of that region may be regarded the center of a hand. Therefore, green points are central points of hand candidate regions in original images when a finger is spread and when a fist is doubled as shown in FIG. 19, but blue points are actually the centers of hand regions in erosion images on the left obtained through an erosion operation. Thus if the central point of a hand region is obtained, the central point serves as a pointer in gesture recognition and, therefore, may be achieved as various interfaces.

A dilation image generator 180 generates a dilation image by applying dilation operations as many times as the same number of erosion operations to an erosion image. Namely, dilation operations are performed as many times as the number of erosion operations performed in conjunction with FIG. 19 to restore a hand to an original size. If dilation operations are performed based on the erosion image shown in FIG. 19 as many times as the number of erosion operations, a thin region corresponding to a finger is eliminated and a thick region corresponding to a hand or wrist is restored.

Figure 20:
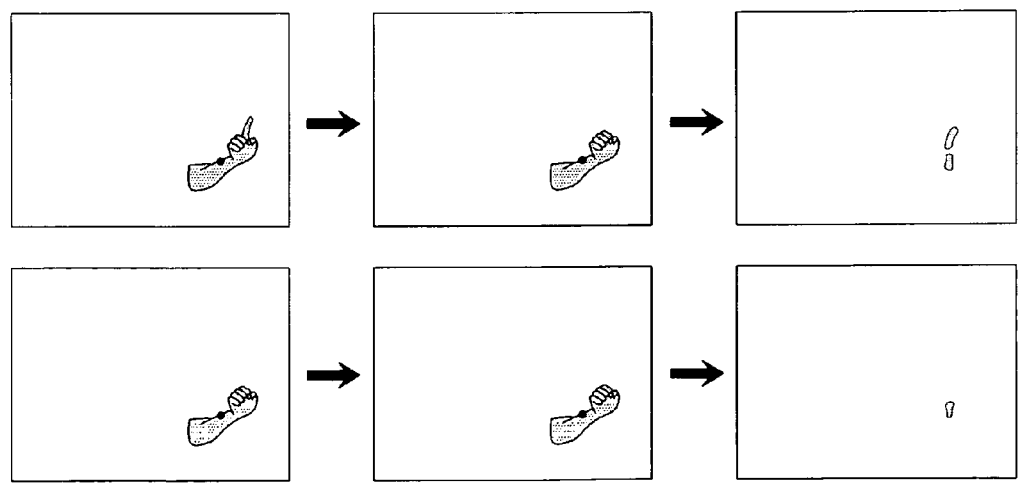

Then a subtraction image generator 185 generates a subtraction image by subtracting the dilation image from the original image. FIG. 20 illustrates a result of hand shape detection. If dilation images in the second column are subtracted from respective original images in the first column, then only regions except for hands and wrists remain as shown in the third column.

A hand shape determiner 190 finally determines a hand shape based on the distance value of a hand. Namely, if the remaining region is larger than a predetermined size, the hand shape determiner 190 determines the remaining region as a finger and otherwise it determines the remaining region as a noise component. Further, the hand shape determiner 190 searches for a region having the largest size in hand regions from the subtraction image and judges whether the searched region is a finger by determining a ratio of a size to a distance of a corresponding area, thereby determining whether a hand shape is a state that an index finger is spread or not. More specifically, if a finger is spread, an original hand image and a dilation image have a difference corresponding to a finger but if a finger is bent, the original hand image and the dilation image have no big difference. Therefore, the subtraction image is generated by subtracting the dilation image from the original image of the hand candidate region and the size of a remaining component in the subtraction image is determined based on information about the distance of a hand, thereby judging whether a finger is spread or not.

Figure 15:
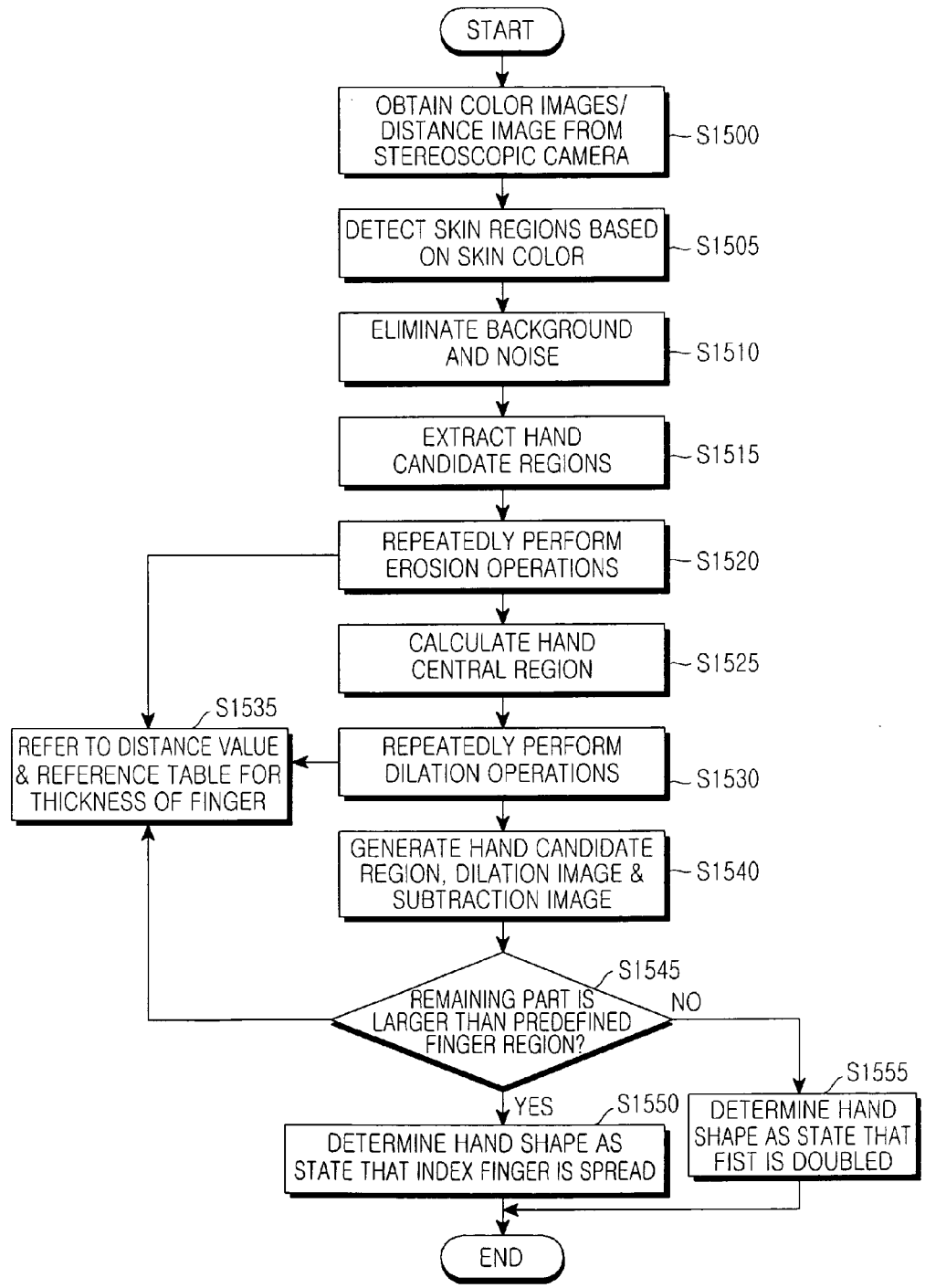
FIG. 15 illustrates a process for detecting a hand shape according to an exemplary embodiment of the present invention.

A process for detecting a hand shape is illustrated in FIG. 15. Referring to FIG. 15, color images and a distance image are obtained from stereoscopic cameras in block S1500 and skin regions are detected based on skin color in block S1505. Background and noise are eliminated from a skin image using the distance image in block S1510. In block S1515, hand candidate regions are extracted from an image in which background and noise are eliminated. Assuming that a user does not move, the sizes of the hand candidates regions are not greatly different even if the user moves hands back and forth. Using such a characteristic, only hand candidate regions which may be a hand except for a face can be extracted from a skin detection image. After the detection of the hand candidate regions, it is necessary to acquire the characteristics of each candidate region through a known BLOB analysis and a stereoscopic disparity value.

Then the expected thickness of a finger can be obtained using a reference table and a distance value of a hand obtained in real time, and erosion operations are repeatedly performed based on them in block S1520. In this case, since the erosion operations are repeatedly performed based on the thickness of a finger, an image in which a finger component is removed can be obtained with reference to the reference table for the thickness of a finger in block 1535. In block S1525, a hand central region is calculated. The central point of a hand may be calculated based on a remaining region in an image. Assuming that a hand is not towards the bottom, a part located higher than a horizontal axis of a screen is determined as a hand and a central point of a corresponding region may be regarded as the center of a hand.

Dilation operations are repeatedly performed as many times as the number of erosion operations in block S1530. In block S1540, an original image of a hand candidate region, a dilation image, and a subtraction image subtracting the dilation image from the original image are generated as in FIG.

20. Even in this case, the reference table for the thickness of a finger is referred to in block S1535. Apart except for a hand and wrist remains in the subtraction image. In block S1545, it is checked whether the remaining part is larger than a predefined finger region. In this case, the reference table for the thickness of a finger is referred to in block S1535. If the remaining part is larger than a predefined finger region, the hand shape is determined as a state that the index finger is spread in block S1550 and otherwise that the hand shape is determined as a state that a fist is doubled in block S1555. It can be recognized whether a finger is spread or not if the size of a remaining component in the subtraction image based on information about the distance of a hand. More particularly, the size of a finger should occupy pixels of a predetermined level in proportion to the size of a hand. The sizes of a hand and a finger do not greatly vary according to users and therefore the sizes of a hand and a finger can be approximately defined by experiment based on an average distance value of a hand. A finger region is almost eroded by the erosion operations performed 'n' times. The finger region can be restored by performing a subtraction operation with an original hand detection image. Otherwise, it can be determined that there is no finger region.

As described above, flexible hand shape detection can be performed without greatly restricting to a user gesture by using a hand shape detection method based on skin color and stereoscopic distance information. Especially, since the stereoscopic distance information and erosion/dilation operations based on the distance information are used, the hand shape detection is not greatly influenced by the orientation or location of a hand or a distance between a camera and a hand. Further, since the distance information of a hand and skin information are organically used, robust detection performance can be obtained.

According to the exemplary embodiments of the present invention, a wrong detection problem using only skin color is solved and both hands can be accurately detected. Moreover, a hand shape can be effectively detected even while a user freely moves. The distance information and skin information are organically used and therefore robust hand detection performance can be obtained. Accordingly, various and interesting image-based interfaces can be achieved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus capable of detecting hands of a subject in real time, the apparatus comprising:
a first image input part configured to generate a first image photographed at a first side with respect to the subject;
a second image input part configured to generate a second image photographed at second side with respect to the subject;
a stereoscopic processor configured to generate a distance image indicating three-dimensional distance information by comparison information of the first image and the second image;
a skin region detector configured to determine whether each pixel within any one of the first and second images is a skin pixel and generate a skin image indicating whether each pixel within any one of the first and second images is a skin pixel;
a skin/distance pixel combiner configured to generate a combined image by combining the distance image with the skin image in units of pixels;
a background and noise eliminator configured to generate an effective image including two or more hand candidate regions by eliminating background and noise from the combined image;
a hand correlation determiner configured to calculate effective values with respect to respective pairs of the hand candidate regions which can be combined within the effective image and determine a pair of hand candidate regions having largest effective values as hand regions;
a hand candidate region detector configured to generate a hand candidate image from which the hand candidate regions are detected; and
an erosion image generator configured to determine a number of erosion operations which are to be repeatedly performed to eliminate pixels corresponding to an expected thickness of a finger within the hand candidate image, with reference to a table which defines the number of erosion operations according to a distance value of a hand and generate an erosion image by repeatedly performing the number of erosion operations.

2. The apparatus of claim 1, wherein the skin/distance pixel combiner includes a skin pixel buffer configured to compensate for a difference in processing time between the skin region detector and the stereoscopic processor.

3. The apparatus of claim 2, wherein the skin/distance pixel combiner is configured to combine a skin image pixel and a distance image pixel which have a same location on an image of an original pixel using the skin pixel buffer.

4. The apparatus of claim 1, wherein the background and noise eliminator is configured to eliminate background from the combined image based on the distance image and eliminate a skin region having a size less than a predetermined size as noise.

5. The apparatus of claim 1, wherein the hand correlation determiner is configured to calculate and then add size priorities, size differences, distance priorities and location differences with respect to the respective pairs of the hand candidate regions which can be combined and determine the pair of hand candidate regions having the largest effective values among the added effective values as the hand regions.

6. The apparatus of claim 1, further comprising:
a hand center operator configured to detect a center of a hand using a phase relationship from the erosion image;
a dilation image generator configured to generate a dilation image by performing a dilation operation based on a number of times the erosion operations are performed;
a subtraction image generator configured to generate a subtraction image by subtracting the dilation image from the hand candidate image; and
a hand shape determiner configured to determine a hand shape using a size of a region remaining in the subtraction image.

7. The apparatus of claim 6, wherein the hand candidate image is an image in which background and noise are eliminated from the skin image based on the distance image.

8. The apparatus of claim 6, wherein the hand shape determiner is configured to compare the size of the region remaining in the subtraction image with a predefined size of a finger region and determine a comparison result as one of a hand shape in which a finger is spread and a hand shape in which a finger is bent.

9. A method for detecting hands of a subject in real time, the method comprising:
determining whether pixels within any of a first image and a second image correspond to left and right images of the subject in a photograph are skin pixels;

generating a skin image indicating whether each pixel within any of the first and second images is a skin pixel;

generating a distance image indicating three-dimensional distance information by comparison information of the first and second images;

generating a combined image by combining the distance image with the skin image in units of pixels;

generating an effective image including at least two hand candidate regions by eliminating background and noise from the combined image;

calculating effective values with respect to respective pairs of the hand candidate regions which can be combined within the effective image;

determining a pair of hand candidate regions having the largest effective values as hand regions;

generating a hand candidate image from which the hand candidate regions are detected;

determining a number of erosion operations which are to be repeatedly performed to eliminate pixels corresponding to an expected thickness of a finger within the hand candidate image, with reference to a table which defines the number of erosion operations according to a distance value of a hand; and generating an erosion image by repeatedly performing erosion operations considering an expected thickness of a finger with respect to the hand candidate image.

10. The method of claim 9, wherein combining the distance image with the skin image comprises combining a skin image pixel and a distance image pixel which have the same location on an image of an original pixel using a skin pixel buffer for compensating for a difference in processing time between the distance image and the skin image.

11. The method of claim 9, wherein generating the effective image includes eliminating background from the combined image based on the distance image and eliminates a skin region having a size less than a predetermined size as noise.

12. The method of claim 9, wherein determining the hand regions includes:
calculating and then adds size priorities, size differences, distance priorities and location differences with respect to respective pairs of the hand candidate regions which can be combined; and
determining the pair of hand candidate regions having the largest effective values among the added effective values as the hand regions.

13. The method of claim 9, further comprising:
detecting a center of a hand using a phase relationship from the erosion image;
generating a dilation image by performing dilation operations with respect to the erosion image based on a number of times the erosion operations are performed;
generating a subtraction image by subtracting the dilation image from the hand candidate image; and
determining a hand shape using a size of a region remaining in the subtraction image.

14. The method of claim 13, wherein the hand candidate image is an image in which background and noise are eliminated from the skin image based on the distance image.

15. The method of claim 13, wherein determining the hand shape comprises comparing the size of the region remaining in the subtraction image with a predefined size of a finger region and determines a comparison result as one of a hand shape in which a finger is spread and a hand shape in which a finger is bent.

16. An image processing system comprising:
a hand shape detection unit, wherein the hand shape detection unit comprises:
a camera interface that includes a first image input part configured to generate a first image photographed at a first side with respect to a subject and a second image input part configured to generate a second image photographed at second side with respect to the subject;
a stereoscopic processor configured to generate a distance image indicating three-dimensional distance information by comparison information of the first image and the second image;
a skin region detector configured to determine whether each pixel within any one of the first and second images is a skin pixel and generate a skin image indicating whether each pixel within any one of the first and second images is a skin pixel;
a skin/distance pixel combiner configured to generate a combined image by combining the distance image with the skin image in units of pixels;
a background and noise eliminator configured to generate an effective image including two or more hand candidate regions by eliminating background and noise from the combined image;
a hand correlation determiner configured to calculate effective values with respect to respective pairs of the hand candidate regions which can be combined within the effective image and determine a pair of hand candidate regions having largest effective values as hand regions;
a hand candidate region detector configured to generate a hand candidate image from which the hand candidate regions are detected; and
an erosion image generator configured to determine a number of erosion operations which are to be repeatedly performed to eliminate pixels corresponding to an expected thickness of a finger within the hand candidate image, with reference to a table which defines the number of erosion operations according to a distance value of a hand and generate an erosion image by repeatedly performing the number of erosion operations; and
a hand detection unit, wherein the image processing system is configured to detect hands of the subject in real time.

17. The system of claim 16, wherein the hand shape detection unit comprises:
a hand center operator configured to detect a center of a hand using a phase relationship from the erosion image;
a dilation image generator configured to generate a dilation image by performing a dilation operation based on a number of times the erosion operations are performed;
a subtraction image generator configured to generate a subtraction image by subtracting the dilation image from the hand candidate image; and
a hand shape determiner configured to determine a hand shape using a size of a region remaining in the subtraction image.

18. The system of claim 16, wherein the background and noise eliminator is configured to eliminate background from the combined image based on the distance image and eliminate a skin region having a size less than a predetermined size as noise.

19. The system of claim 16, wherein the hand correlation determiner is configured to calculate and add size priorities, size differences, distance priorities and location differences with respect to the respective pairs of the hand candidate regions which can be combined and determine a pair of hand candidate regions having the largest effective values among the added effective values as the hand regions.

* * * * *